United States Patent
Xie et al.

(10) Patent No.: US 9,904,384 B2
(45) Date of Patent: Feb. 27, 2018

(54) TOUCH STRUCTURE FOR DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Xiaodong Xie, Beijing (CN); Ming Hu, Beijing (CN); Ming Zhang, Beijing (CN); Zouming Xu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 14/894,940

(22) PCT Filed: May 19, 2015

(86) PCT No.: PCT/CN2015/079236
§ 371 (c)(1),
(2) Date: Nov. 30, 2015

(87) PCT Pub. No.: WO2016/115796
PCT Pub. Date: Jul. 28, 2016

(65) Prior Publication Data
US 2016/0342230 A1  Nov. 24, 2016

(30) Foreign Application Priority Data
Jan. 23, 2015 (CN) .......................... 2015 1 0036145

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0418* (2013.01); *G06F 2203/04111* (2013.01)

(58) Field of Classification Search
CPC ..................................................... G06F 3/041
(Continued)

(56) References Cited

U.S. PATENT DOCUMENTS

2010/0134436 A1  6/2010  Jeong et al.
2013/0328830 A1*  12/2013  Han ...................... G06F 3/0418
                                                                345/174
(Continued)

FOREIGN PATENT DOCUMENTS

CN       102473049       5/2012
CN       202600653       12/2012
(Continued)

OTHER PUBLICATIONS

International Search Report from PCT Application No. PCT/CN2015/079236, dated Sep. 30, 2015, 2 pages.
Written Opinion of the International Searching Authority from PCT Application No. PCT/CN2015/079236, dated Sep. 30, 2015, 5 pages.
Office Action from corresponding Chinese Application No. 201510036145.1, dated Feb. 4, 2017 (6 pages).

*Primary Examiner* — Long D Pham
(74) *Attorney, Agent, or Firm* — Harness, Dickey & Pierce, P.L.C.

(57) ABSTRACT

A touch structure, touch screen and display device are disclosed. The touch structure comprises a plurality of first touch electrodes extending in a first direction and a plurality of second touch electrodes extending in a second direction, wherein the first touch electrodes and the second touch electrodes are intersected with each other, and each of the first touch electrodes comprises a metal wire part and a transparent electrode part, and/or each of the second touch electrodes comprises a metal wire part and a transparent electrode part. The touch structure according to the embodi-
(Continued)

ments of the present invention can alleviate or even eliminate Moire fringe phenomenon, and thus improve display quality of a touch screen.

16 Claims, 6 Drawing Sheets

(58) Field of Classification Search
USPC .......................................................... 345/173
See application file for complete search history.

(56) References Cited

U.S. PATENT DOCUMENTS

| 2015/0029423 | A1* | 1/2015 | Huang | ..................... | G06F 3/047 |
|---|---|---|---|---|---|
| | | | | | 349/12 |
| 2016/0179266 | A1* | 6/2016 | Yang | ....................... | G06F 3/044 |
| | | | | | 345/174 |

FOREIGN PATENT DOCUMENTS

| CN | 103049155 | | 4/2013 |
|---|---|---|---|
| CN | 104216598 | | 12/2014 |
| CN | 104407759 | | 3/2015 |
| CN | 104571711 | | 4/2015 |
| WO | WO 2014/139232 | * | 9/2014 |

* cited by examiner

TOUCH STRUCTURE FOR DISPLAY APPARATUS

TECHNICAL FIELD

The present invention relates to the technical field of touch display and, in particular, to a touch structure, touch screen and display device.

BACKGROUND

Touch screen is widely used in intelligent terminals; and its touch structure for implementing touch operation comprises a plurality of first touch electrodes extending in a first direction, and a plurality of second touch electrodes extending in a second direction intersecting with the first direction, to form a grid structure by which the touch structure may identify the user's touch location and action.

In the prior art, the first and second touch electrodes included in the touch structure are usually ITO (indium tin oxide) electrodes or metal electrodes. However, there are various problems when the two types of electrodes discussed above are used as the first and second electrodes.

More specifically, the relatively low yield makes the ITO price high, as a result, using ITO electrodes as the first and second touch electrodes significantly increases the touch structure's production cost. On the other hand, although using metal electrodes as the first and second touch electrodes can reduce the cost while obtaining a higher signal transfer speed, the metal grid structure formed of the first and second touch electrodes may cause Moire fringe to appear on the touch screen, and thus the display quality may be decreased.

SUMMARY

In order to solve at least one of the technical problems existing in the prior art, embodiments of the present invention provide a touch structure, touch screen and display device which can alleviate the Moire fringe phenomenon, and thus improve the display quality.

According to an embodiment of the present invention, there is provided a touch structure, which comprises a plurality of first touch electrodes extending in a first direction and a plurality of second touch electrodes extending in a second direction, wherein the first touch electrodes and the second touch electrodes are intersected with each other, each of the first touch electrodes comprises a metal wire part and a transparent electrode part, and/or each of the second touch electrodes comprises a metal wire part and a transparent electrode part.

In an embodiment, each of the first touch electrodes comprises a metal wire part and a transparent electrode part, and in each first touch electrode, the sum of the number of the metal wire parts and the number of the transparent electrode parts is at least three, and the metal wire parts and the transparent electrode parts are alternately arranged.

In an embodiment, the metal wire parts of any two adjacent first touch electrodes are positioned such that they are staggered from each other in the first direction.

In an embodiment, the metal wire parts of any two adjacent first touch electrodes are positioned such that they correspond to each other in the first direction.

In an embodiment, each of the second touch electrodes comprises a metal wire part and a transparent electrode part, and in each second touch electrode, the sum of the number of the metal wire parts and the number of the transparent electrode parts is at least three, and the metal wire parts and the transparent electrode parts are alternately arranged.

In an embodiment, the metal wire parts of any two adjacent first touch electrodes are positioned such that they are staggered from each other in the first direction, and the metal wire parts of any two adjacent second touch electrodes are positioned such that they are staggered from each other in the second direction.

In an embodiment, the metal wire parts of any two adjacent first touch electrodes are positioned such that they are staggered from each other in the first direction, and the metal wire parts of any two adjacent second touch electrodes are positioned such that they correspond to each other in the second direction.

In an embodiment, the metal wire parts of any two adjacent first touch electrodes are positioned such that they correspond to each other in the first direction, and the metal wire parts of any two adjacent second touch electrodes are positioned such that they correspond to each other in the second direction.

In an embodiment, the touch structure further comprises: a plurality of first transparent electrodes extending in the first direction and spaced from the first touch electrodes; and/or a plurality of second transparent electrodes extending in the second direction and spaced from the second touch electrodes.

In an embodiment, the touch structure comprises a plurality of first transparent electrodes extending in the first direction, wherein at least one of the first transparent electrodes is arranged between every two adjacent first touch electrodes.

In an embodiment, the touch structure further comprises a plurality of second transparent electrodes extending in the second direction, wherein at least one of the second transparent electrodes is arranged between every two adjacent second touch electrodes.

In an embodiment, the touch structure further comprises: a plurality of first metal electrodes extending in the first direction and spaced from the first touch electrodes; and/or a plurality of second metal electrodes extending in the second direction and spaced from the second touch electrodes.

In an embodiment, the touch structure further comprises: a plurality of first metal electrodes extending in the first direction and spaced from the first touch electrodes and the first transparent electrodes; and/or a plurality of second metal electrodes extending in the second direction and spaced from the second touch electrodes and the second transparent electrodes.

As a further technical solution, according to an embodiment of the present invention, there is provided another touch structure, which comprises a plurality of first electrodes extending in a first direction, and a plurality of second electrodes extending in a second direction, wherein the plurality of first electrodes comprises a plurality of first metal electrodes and a plurality of first transparent electrodes, and at least one first transparent electrode is arranged between every two adjacent first metal electrodes, and/or wherein the plurality of second electrodes comprises a plurality of second metal electrodes and a plurality of second transparent electrodes, and at least one second transparent electrode is arranged between every two adjacent second metal electrodes.

As a further technical solution, according to an embodiment of the present invention, there is provided a touch screen which comprises the touch structure in accordance with the embodiment of the present invention.

As a further technical solution, according to an embodiment of the present invention, there is provided a display device which comprises the touch screen in accordance with the embodiment of the present invention.

The embodiments of the present invention have the following advantages:

In the first touch structure according to the embodiment of the present invention, the metal wire parts and the transparent electrode parts are alternately arranged in the first touch electrodes and/or the second touch electrodes, which can avoid a continuous and regular metal grid. As compared with the metal grid formed by metal electrodes in the prior art, such arrangement can alleviate or even eliminate the Moire fringe phenomenon, and thus improve and increase the display quality of the touch screen. Also, as compared with the solution in which ITO electrodes are used in the prior art, the touch structure of the embodiment of the present invention can reduce the length of the transparent electrodes (ITO electrodes), and thus reduce the cost while increasing transmission speed of signal in the electrodes.

In the second touch structure according to the embodiment of the present invention, the transparent electrodes and the metal electrodes are alternately arranged in the first direction and/or second direction, with at least one transparent electrode arranged between the adjacent metal electrodes. Such arrangement can increase the distance between the adjacent metal electrodes. Therefore, as compared with the regular metal grid formed by the metal electrodes in the prior art, the density of the metal grid in the touch structure of the embodiment of the present invention can be reduced, thereby alleviating the Moire fringe phenomenon. Also, as compared with the solution in which the ITO electrodes are mainly used in the prior art, the touch structure of the embodiment of the present invention can reduce the length of the transparent electrodes (ITO electrodes), and thus reduce the cost while increasing transmission speed of signal in the electrodes.

The touch screen according to the embodiment of the present invention utilizes the above described touch structure. As a result, it can alleviate or even eliminate the Moire fringe phenomenon, and provide good display quality.

The display device according to the embodiment of the present invention utilizes the above described touch screen. As a result, it can alleviate or even eliminate the Moire fringe phenomenon, and provide good display quality.

BRIEF DESCRIPTION OF THE DRAWINGS

The figures are provided to facilitate further understanding of the embodiments of the present invention, form a part of the specification and used to explain the present invention along with the embodiments described hereinafter, but in no way limit the scope of the present invention, in which.

REFERENCE NUMBERS

10: First Touch Electrode; 100: Metal Wire Part; 101: Transparent Electrode Part; 11: First Transparent Electrode; 12: First Metal Electrode; 20: Second Touch Electrode; 200: Metal Wire Part; 201: Transparent Electrode Part; 22: Second Transparent Electrode; 30: Insulation Layer.

DETAILED DESCRIPTION

The embodiments of the present invention are described below in conjunction with the drawings. It would be appreciated that the embodiments described here are only intended to illustrate and explain, rather than limit the present invention.

Figure 1:
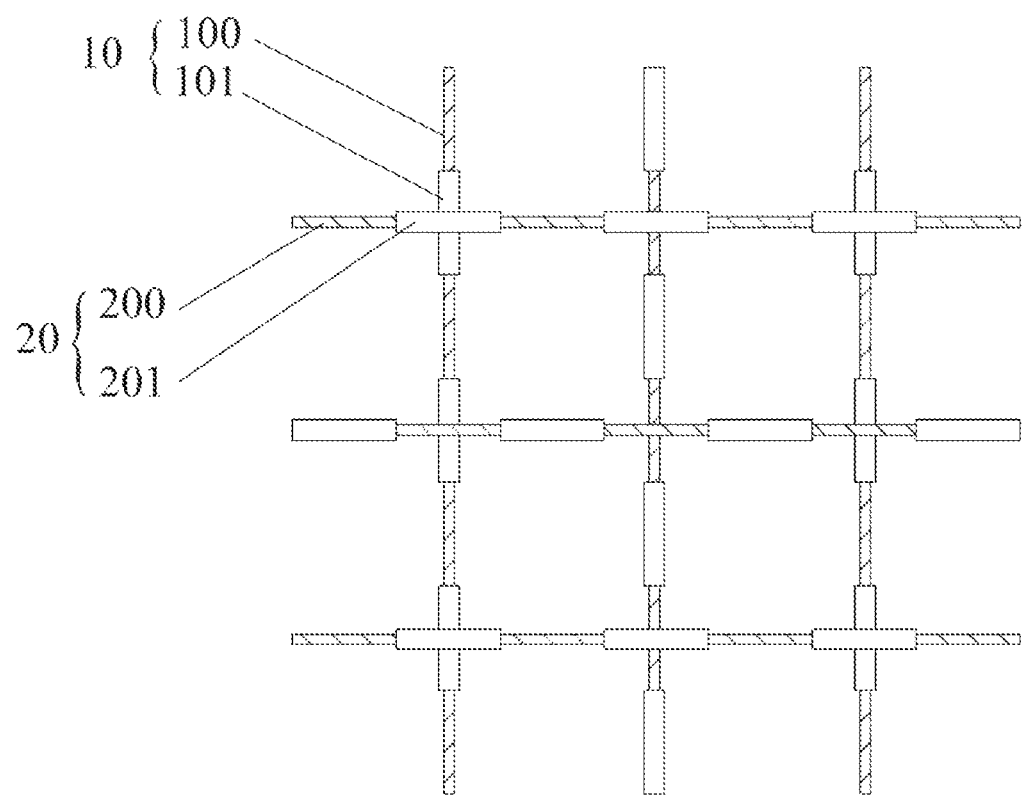
FIG. 1 is a schematic diagram illustrating the touch structure according to an embodiment of the present invention.
Figure 2:
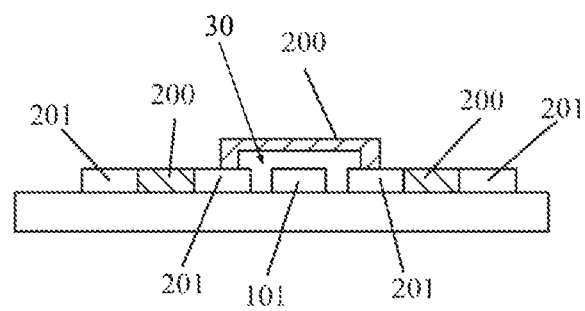
FIG. 2 is a schematic diagram illustrating the place where the first touch electrode and the second electrode are intersected.

An embodiment of the present invention provides a touch structure, and FIG. 1 is a schematic diagram illustrating the touch structure according to the embodiment of the present invention. In the embodiment of the invention, as shown in FIG. 1, the touch structure comprises a plurality of first touch electrodes 10 extending in a first direction and a plurality of second touch electrodes 20 extending in a second direction, and the first touch electrodes 10 and the second touch electrodes 20 are intersected with and insulated from each other. Each first touch electrode 10 comprises a metal wire part 100 and a transparent electrode part 101, and each second touch electrode 20 comprises a metal wire part 200 and a transparent electrode part 201. More specifically, as shown in FIG. 2, an insulation layer 30 is arranged at the place where the first touch electrode 10 and the second touch electrode 20 are intersected. The insulation layer 30 is arranged such that the metal wire part 100 or the transparent electrode part 101 of the first touch electrode 10 is not electrically connected to the metal wire part 200 or the transparent electrode part 201 of the second touch electrode 20 at the intersection. The metal wire part 100, 200 may be made of a metal or alloy material with good conductivity, such as silver, copper, gold, aluminum, or the like. The transparent electrode part 101, 201 may be an ITO electrode, an IZO electrode, an IGZO electrode, or an InGaSnO electrode, or the like. The first direction and the second direction may represent the row direction and column direction respectively, and vice versa.

As shown in FIG. 1, the metal wire parts 100 and the transparent electrode parts 101 of the first touch electrodes 10 are alternately arranged, the metal wire parts 200 and the transparent electrode parts 201 of the second touch electrodes 20 are also alternately arranged, which can avoid a continuous and regular metal grid. As compared with the metal grid formed by the whole metal electrodes in the prior art, such arrangement can alleviate or even eliminate the Moire fringe phenomenon, and thus improve the display quality of the touch screen. Also, as compared with the solution in which the ITO electrodes are used in the prior art, the touch structure of the embodiment of the present invention can reduce the length of the transparent electrodes (ITO electrodes), and reduce the cost while increasing transmission speed of signal in the electrodes.

More specifically, in each first touch electrode 10 the sum of the number of the metal wire parts 100 and the number of the transparent electrode parts 101 is at least three, and the metal wire parts 100 and the transparent electrode parts 101 are alternately arranged. In each second touch electrode 20 the sum of the number of the metal wire parts 200 and the number of the transparent electrode parts 201 is at least three, and the metal wire parts 200 and the transparent electrode parts 201 are alternately arranged. It should be understood that the larger the number of the metal wire parts 100 and the transparent electrode parts 101 included in each first touch electrode 10 is, the smaller the length of each metal wire part 101 is. In this manner, as compared with the situation where a single metal wire part 100 has a greater length, the embodiment of the present invention can reduce the probability of forming a continuous and regular metal grid, and can further alleviate the Moire fringe phenomenon. Therefore, in some embodiments of the present invention, the first touch electrode 10 may comprise as many metal wire parts 100 and transparent electrode parts 101 as possible, if the manufacturing process allows it. The second touch electrode 20 is similar to the first touch electrode and its description is therefore omitted.

Figure 3:
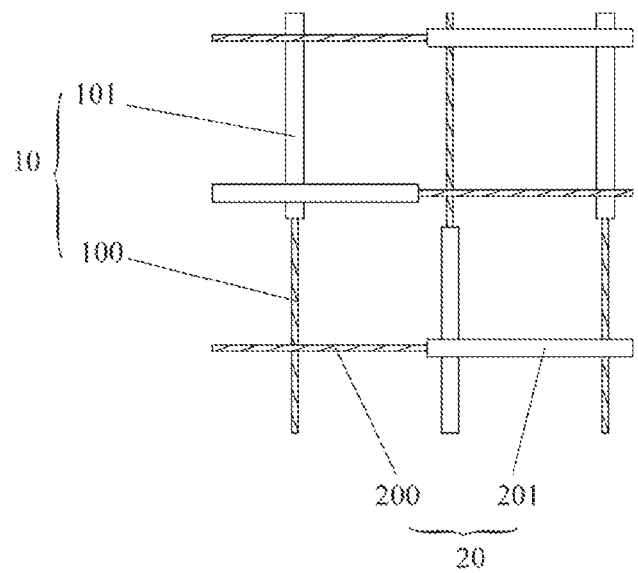
FIG. 3 is a schematic diagram illustrating the case in which the number of the metal wire part and the number of the transparent electrode part are respectively one in the first touch electrode and the second electrode.

Of course, the number of the metal wire parts 100 and the number of transparent electrode parts 101 included in each first touch electrode 10 may be one, also, the number of the metal wire parts 200 and the number of transparent electrode parts 201 included in each second touch electrode 20 may be one, as shown in FIG. 3. This inevitably results in a metal grid structure, however, such arrangement indeed alleviates the Moire fringe phenomenon as compared with the metal grid formed by the whole metal electrodes in the prior art, because the distance between the adjacent metal wires is increased, or the metal grid structure is only partially formed.

In an embodiment, as shown in FIG. 1, the metal wire part 100 of each first touch electrode 10 correspond to the transparent electrode part 101 of an adjacent first touch electrode in a direction perpendicular to the first direction. This may prevent the metal wire parts 100 of the two adjacent first touch electrodes 10 from corresponding to each other in the first direction, and thus avoid the Moiro fringe phenomenon which may otherwise occur. Similarly, the metal wire part 200 of each second touch electrode 20 is arranged to correspond to the transparent electrode parts 201 of an adjacent second touch electrode 20 in a direction perpendicular to the second direction, so as to prevent the metal wire parts 200 of the two adjacent second touch electrodes 20 from corresponding to each other in the second direction. It will be appreciated that the metal wire parts 100 of any two first touch electrode 10 may be staggered from each other in the first direction. The metal wire part 100 of one first touch electrode 10 may overlap, or partially overlap the transparent electrode part 101 of the adjacent touch electrode 10 in their positions in the first direction, or lie within the transparent electrode parts 101. The metal wire part 200 and transparent electrode part 201 of the adjacent second touch electrodes may have the similar position relation and is therefore omitted.

Figure 4:
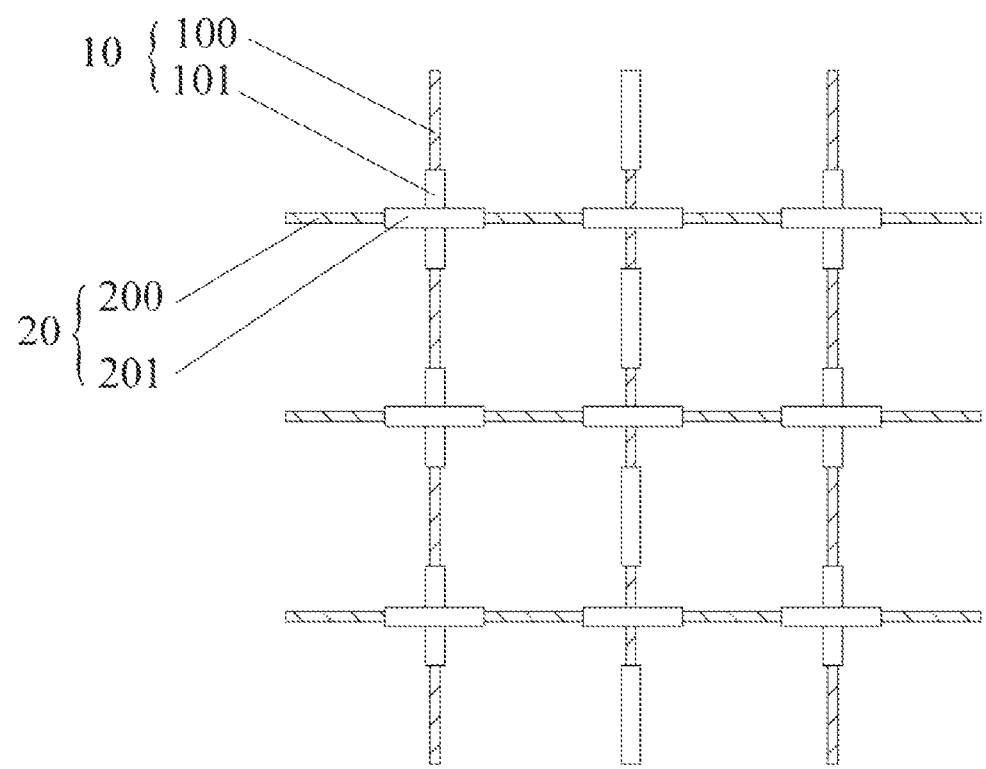
FIG. 4 is a schematic diagram illustrating that the metal wire parts of the two adjacent second touch electrodes correspond to each other.

In addition to the embodiment shown in FIG. 1, in the embodiment as shown in FIG. 4, in the case that the metal wire part 100 of each first touch electrode 10 are positioned such that they correspond to the transparent electrode parts 101 of an adjacent first touch electrode 10 in the first direction, the metal wire parts 200 of each second touch electrode 20 are positioned such that they correspond to the metal wire parts 200 of an adjacent second touch electrode 20 in the second direction. Although the Moire fringe phenomenon may occur in the second direction, such arrangement can alleviate the Moire fringe phenomenon as compared with the prior art. Of course, the Moire fringe phenomenon may be avoided in the second direction by means of the contrary arrangement.

Figure 5:
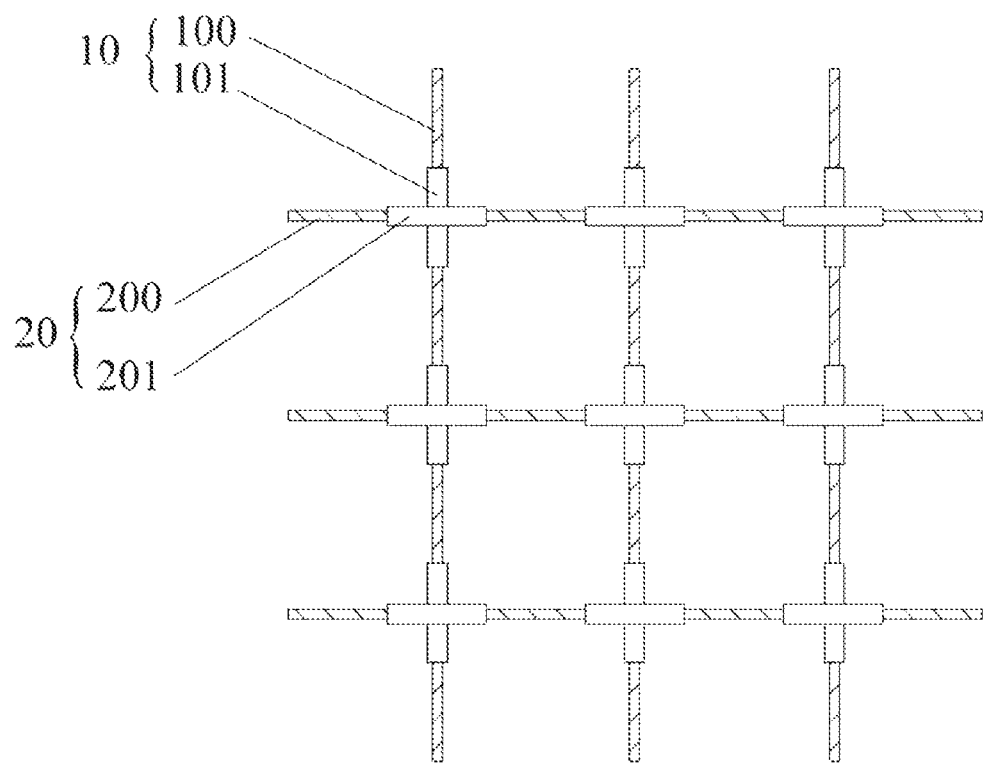
FIG. 5 is a schematic diagram illustrating that the metal wire parts of the two adjacent first touch electrodes correspond to each other, and the metal wire parts of the two adjacent second touch electrodes correspond to each other.

Similarly, according to the embodiment as shown in FIG. 5, the metal wire parts 100 of two adjacent first touch electrodes 10 are positioned such that they correspond to each other in the first direction, and the metal wire parts 200 of two adjacent second touch electrodes 20 are positioned such that they correspond to each other in the second direction.

In some embodiments of the present invention, unlike those embodiments in which both of the first touch electrode 10 and the second touch electrode 20 comprise the metal wire parts as well as the transparent electrode parts, only the first touch electrode 10 comprises the metal wire parts 100 and transparent electrodes 101. Such arrangement can avoid the Moire fringe phenomenon in the first direction, and thus improve the display quality. It will be appreciated that, in this case, the sum of the number of the metal wire parts 100 and the number of the transparent electrodes 101 may be at least three and the metal wire parts 100 and the transparent electrodes 101 are alternately arranged, in order to reduce the probability of forming a continuous and regular metal grid and avoid the Moire fringe phenomenon. Also, it is possible that the metal wire parts 100 of each first touch electrode 10 may be positioned such that they correspond to the transparent electrode parts 101 of an adjacent first touch electrode 10 in the first direction, or the metal wire parts 100 of each first touch electrode 10 may be positioned such that they correspond to the metal wire parts 100 of an adjacent first touch electrode 10 in the first direction.

Figure 6:
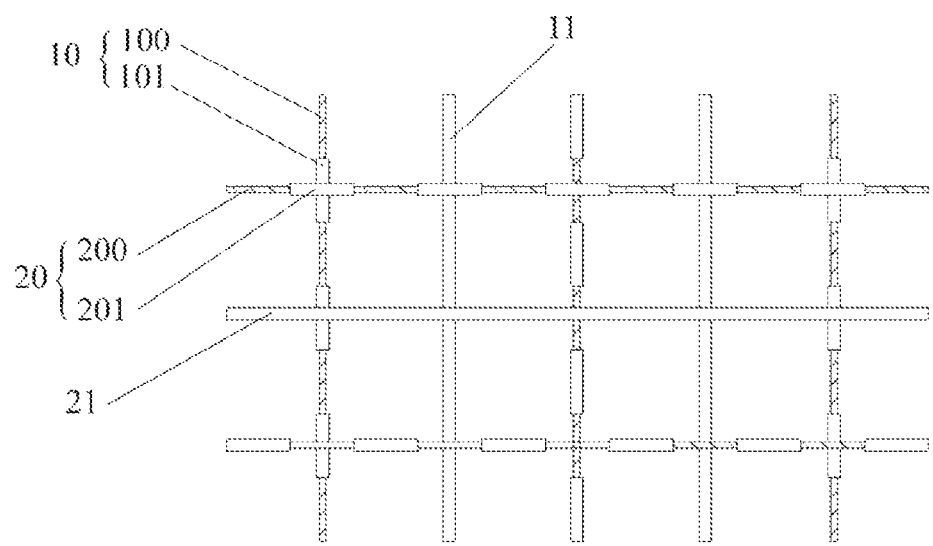
FIG. 6 is a schematic diagram illustrating the touch structure which further comprises a first transparent electrode and a second transparent electrode.

In the embodiment as shown in FIG. 6, the touch structure may further comprise a plurality of first transparent electrodes 11 extending in the first direction and spaced from the first touch electrodes 10, and/or a plurality of second transparent electrodes 21 extending in the second direction and spaced from the second touch electrodes 20. Such arrangement can increase the distance between two adjacent first touch electrodes 10, and/or increase the distance between two adjacent second touch electrodes 20, whereby the distance between the metal wire parts 100 of two adjacent first touch electrodes 10 and/or the distance between the metal wire parts 200 of two adjacent second touch electrodes 20 is increased, and the Moire fringe phenomenon may be further alleviated. In an embodiment, at least one first transparent electrode 11 may be arranged between every two adjacent first touch electrodes 10, and at least one second transparent electrode 21 may be arranged between every two adjacent second touch electrodes 20, in order to uniformly alleviate the Moire fringe phenomenon in both the first and second directions.

Figure 7:
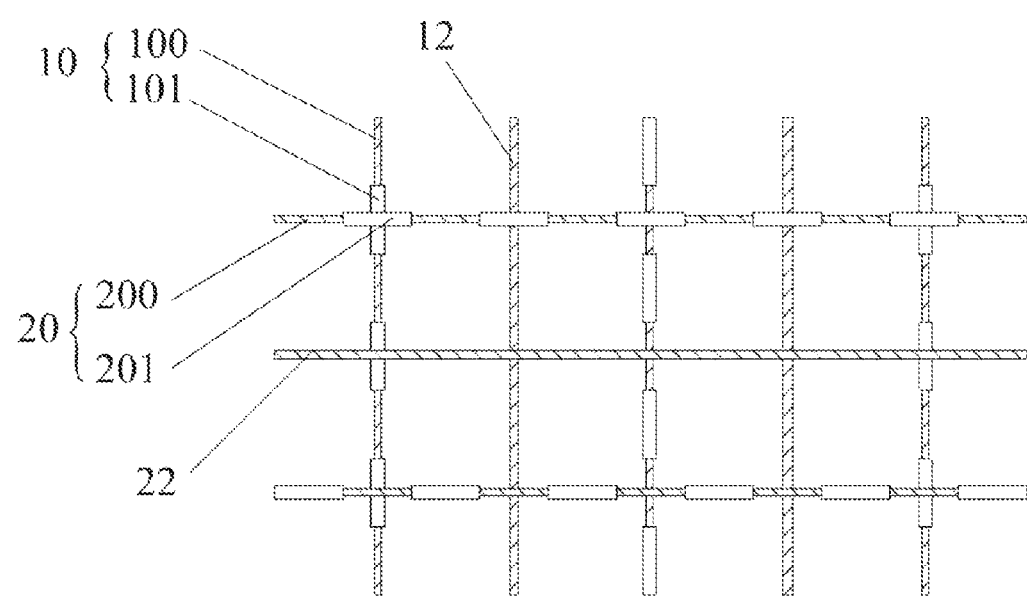
FIG. 7 is a schematic diagram illustrating the touch structure which further comprises a first metal electrode and a second metal electrode.
Figure 8:
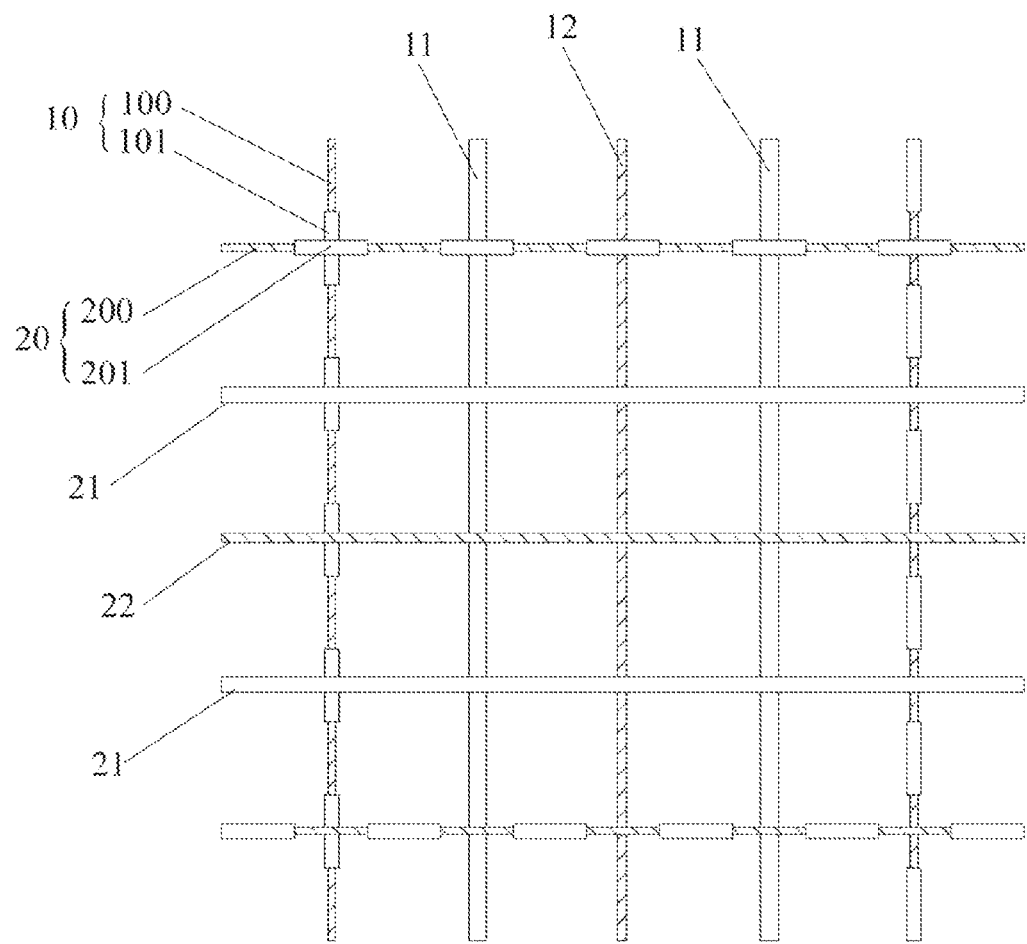
FIG. 8 is a schematic diagram illustrating the touch structure which comprises a first transparent electrode, a first metal electrode, a second transparent electrode, and a second metal electrode.

In some embodiments of the present invention, the touch structure may further comprise a plurality of first metal electrodes 12 extending in the first direction, and/or a plurality of second metal electrodes 22 extending in the second direction. The first metal electrodes 12 are spaced from the first touch electrodes 10, as shown in FIG. 7, or the first metal electrodes 12 are spaced from the first touch electrodes 10 and the first transparent electrodes 11, as shown in FIG. 8. The second metal electrodes 22 are spaced from the second touch electrodes 20, as shown in FIG. 7, or the second metal electrodes 22 are spaced from the second touch electrodes 20 and the second transparent electrodes 21, as shown in FIG. 8. Such arrangement can further reduce the length of the transparent electrodes, and thus further reduce the manufacturing cost while obtaining the higher transmission speed of signal.

In summary, according to the touch structure of the embodiments of the present invention, the metal wire parts and the transparent electrode parts are alternately arranged in the first touch electrodes 10 and/or the second touch electrodes 20, which can avoid forming a continuous and regular metal grid. As compared with the metal grid formed by the metal electrodes in the prior art, such arrangement can alleviate or even eliminate the Moire fringe phenomenon, and thus improve and increase the display quality of the touch screen. Also, as compared with the solution in which the ITO electrodes are used in the prior art, the touch structure according to the embodiment can reduce the length of the transparent electrodes (ITO electrodes), and reduce the cost while increasing the transmission speed of signal in the electrodes.

Figure 9:
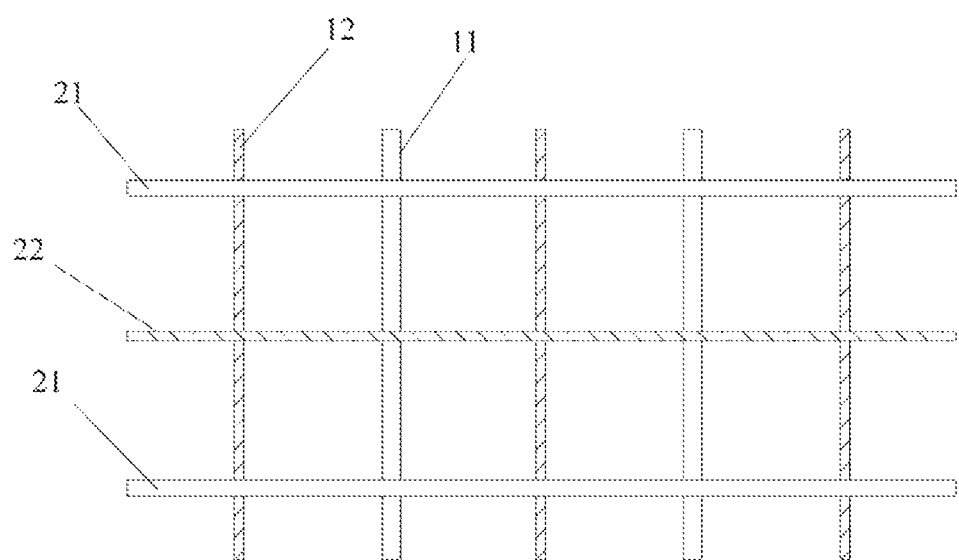
FIG. 9 is a schematic diagram of the touch structure according to another embodiment of the present invention.

Another embodiment of the present invention provides another touch structure, the schematic diagram of which is illustrated in FIG. 9. In the embodiment shown in FIG. 9, the touch structure comprises a plurality of first electrodes extending in a first direction and a plurality of second electrodes extending in a second direction. The plurality of first electrodes comprises a plurality of first metal electrodes 12 and a plurality of first transparent electrodes 11, and at least one first transparent electrode 11 is arranged between every two adjacent first metal electrodes 12; and/or the plurality of second electrodes comprises a plurality of second metal electrodes 22 and a plurality of second transparent electrodes 21, and at least one second transparent electrode 21 is arranged between every two adjacent second metal electrodes 22.

According to this embodiment, in the first direction and/or second direction the transparent electrodes and the metal electrodes are alternately arranged and at least one transparent electrode is arranged between two adjacent metal electrodes. Such arrangement can increase the distance between the adjacent metal electrodes. Therefore, as compared with the regular metal grid formed by the metal electrodes in the prior art, the density of the metal grid in the touch structure of the embodiment can be reduced, and thus the Moire fringe phenomenon can be alleviated. Also, as compared with the solution in which the ITO electrodes are used in the prior art, the touch structure of the embodiment can reduce the length of the transparent electrodes (ITO electrodes), and reduce the cost while increasing the transmission speed of signal in the electrodes.

An embodiment of the present invention also provides a touch screen which comprises the touch structure as discussed in the above embodiments.

The touch screen of the embodiment of the present invention utilizes the touch structure according to the above embodiments. As a result, it can alleviate or even eliminate the Moire fringe phenomenon, and provide the good display quality.

An embodiment of the present invention also provides a display device which comprises the touch screen according to the above embodiment.

The display device may be a liquid crystal display (LCD) device, an OLED device, an electronic paper, a mobile phone with touch control function, a display, a television set, a digital photo frame or a navigator, or the like.

The display device according to the embodiment of the present invention utilizes the touch screen of the above embodiments. As a result, it can alleviate or even eliminate the Moire fringe phenomenon, and provide the good display quality.

It would be appreciated that foresaid embodiments are only exemplary embodiments intended for explaining the principle of the present invention and the present invention is not limited thereto. Without departing the spirit and substance of the present invention, the ordinary skilled in the art is able to make various variants and improvements, all of which shall fall into the scope of the present invention.

What is claimed is:

1. A touch structure comprising:
a plurality of first touch electrodes extending in a first direction; and
a plurality of second touch electrodes extending in a second direction intersecting the first direction, wherein:
each of the first touch electrodes comprises a non-transparent metal wire part and a transparent electrode part, and/or each of the second touch electrodes comprises a non-transparent metal wire part and a transparent electrode part;
the non-transparent metal wire parts of any two adjacent first touch electrodes are positioned such that they are staggered from each other in the first direction; and
the non-transparent metal wire part of at least one of the first touch electrodes is positioned such that said non-transparent metal wire part corresponds to the transparent electrode part of a directly adjacent one of the first touch electrodes in a direction perpendicular to the first direction.

2. The touch structure according to claim 1, wherein in each of the first touch electrodes, the sum of the number of the non-transparent metal wire parts and the number of the transparent electrode parts is at least three, and the non-transparent metal wire parts and the transparent electrode parts are alternately arranged.

3. The touch structure according to claim 2, wherein in each of the second touch electrodes, the sum of the number of the non-transparent metal wire parts and the number of the transparent electrode parts is at least three, and the non-transparent metal wire parts and the transparent electrode parts are alternately arranged.

4. The touch structure according to claim 3, wherein the non-transparent metal wire parts of any two adjacent second touch electrodes are positioned such that they are staggered from each other in the second direction.

5. The touch structure according to claim 2, wherein the touch structure further comprises:
a plurality of first transparent electrodes extending in the first direction and spaced from the first touch electrodes; and/or
a plurality of second transparent electrodes extending in the second direction and spaced from the second touch electrodes;
or wherein the touch structure further comprises:
a plurality of first metal electrodes extending in the first direction and spaced from the first touch electrodes; and/or a plurality of second metal electrodes extending in the second direction and spaced from the second touch electrodes.

6. The touch structure according to claim 3, wherein the non-transparent metal wire parts of any two adjacent second touch electrodes are positioned such that they correspond to each other in the second direction.

7. The touch structure according to claim 3, wherein the touch structure further comprises:
   a plurality of first transparent electrodes extending in the first direction and spaced from the first touch electrodes; and/or
   a plurality of second transparent electrodes extending in the second direction and spaced from the second touch electrodes;
   or wherein the touch structure further comprises:
   a plurality of first metal electrodes extending in the first direction and spaced from the first touch electrodes; and/or
   a plurality of second metal electrodes extending in the second direction and spaced from the second touch electrodes.

8. The touch structure according to claim 1, wherein the touch structure further comprises:
   a plurality of first transparent electrodes extending in the first direction and spaced from the first touch electrodes; and/or
   a plurality of second transparent electrodes extending in the second direction and spaced from the second touch electrodes.

9. The touch structure according to claim 8, wherein at least one first transparent electrode is arranged between every two adjacent first touch electrodes.

10. The touch structure according to claim 9, wherein at least one second transparent electrode is arranged between every two adjacent second touch electrodes.

11. The touch structure according to claim 8, wherein the touch structure further comprises:
   a plurality of first metal electrodes extending in the first direction and spaced from the first touch electrodes and the first transparent electrodes; and/or
   a plurality of second metal electrodes extending in the second direction and spaced from the second touch electrodes and the second transparent electrodes.

12. The touch structure according to claim 1, wherein the touch structure further comprises:
   a plurality of first metal electrodes extending in the first direction and spaced from the first touch electrodes; and/or
   a plurality of second metal electrodes extending in the second direction and spaced from the second touch electrodes.

13. A touch screen comprising the touch structure according to claim 1.

14. A display device comprising the touch screen according to claim 13.

15. A touch structure comprising:
   a plurality of first electrodes extending in a first direction; and
   a plurality of second electrodes extending in a second direction, wherein:
   the plurality of first electrodes comprises a plurality of first non-transparent metal electrodes and a plurality of first transparent electrodes, at least one first transparent electrode is arranged between every two adjacent first non-transparent metal electrodes, and at least one of the first non-transparent metal electrodes corresponds to a directly adjacent one of the first transparent electrodes in a direction perpendicular to the first direction; and/or
   the plurality of second electrodes comprises a plurality of second non-transparent metal electrodes and a plurality of second transparent electrodes, at least one second transparent electrode is arranged between every two adjacent second non-transparent metal electrodes, and at least one of the second non-transparent metal electrodes corresponds to a directly adjacent one of the second transparent electrodes in a direction perpendicular to the second direction.

16. A touch screen comprising the touch structure according to claim 15.

* * * * *